United States Patent
Wickholm et al.

[11] Patent Number: 5,191,470
[45] Date of Patent: * Mar. 2, 1993

[54] MONOCULAR OPTICAL INSPECTION SYSTEM WITH LONG EYE RELIEF AND ENHANCED DEPTH PERCEPTION

[75] Inventors: David R. Wickholm; Donald J. Strittmatter, both of Tucson, Ariz.

[73] Assignee: Hughes Aircraft Company, Los Angeles, Calif.

[ * ] Notice: The portion of the term of this patent subsequent to Apr. 25, 2006 has been disclaimed.

[21] Appl. No.: 344,737

[22] Filed: Apr. 28, 1989

[51] Int. Cl.$^5$ .......................... G02B 21/20; G02B 7/02
[52] U.S. Cl. .................................... 359/375; 359/407; 359/816
[58] Field of Search ............... 350/401, 132, 500-502, 350/507-528, 540-550, 563-567, 245-250, 276 R, 286-287, 506, 537-539, 562, 144, 145-146, 370, 379, 266, 268, 283; 250/201.4; 356/144-153, 250-252; 359/367-390, 432-435, 407-410, 480-482, 503-506, 816, 831

[56] References Cited

U.S. PATENT DOCUMENTS

| | | | |
|---|---|---|---|
| 2,318,705 | 5/1943 | Morgan | 359/386 |
| 2,620,706 | 12/1952 | Levin | 359/399 |
| 2,624,236 | 1/1953 | Kirkpatrick et al. | 359/386 |
| 2,862,417 | 12/1958 | Baker et al. | 350/562 |
| 2,949,056 | 8/1960 | Loeck | 350/562 |
| 3,721,488 | 3/1973 | Kuhne | 350/565 |
| 3,799,680 | 3/1974 | Weisner | 350/520 |
| 4,159,163 | 6/1979 | Dudley | 350/144 |
| 4,582,400 | 4/1986 | Lough | 359/402 |
| 4,614,411 | 9/1986 | Hörenz | 350/516 |
| 4,619,503 | 10/1986 | Reinheimer et al. | 359/372 |
| 4,687,913 | 8/1987 | Chaban | 350/527 |
| 4,824,228 | 4/1989 | Wickholm et al. | 350/516 |
| 5,044,743 | 9/1991 | Ting | 359/493 |

FOREIGN PATENT DOCUMENTS

| | | | |
|---|---|---|---|
| 191114 | 8/1988 | Japan | 359/385 |
| 165559 | 11/1980 | Netherlands | 350/566 |
| 960709 | 9/1982 | U.S.S.R. | 350/410 |

Primary Examiner—Bruce Y. Arnold
Assistant Examiner—Thong Nguyen
Attorney, Agent, or Firm—R. M. Heald; C. D. Brown; W. K. Denson-Low

[57] ABSTRACT

A monocular inspection system (10) having a substantial eye relief (62), a large exit pupil, and a line of sight viewing of an object under observation (14). The inspection system (10) includes an objective lens assembly (20) which forms an image of the object (14) and which has an axis coincident with an optical path (66). A prism (16) redirects the optical path (66) to coincide with a viewing axis (64) such that the image is formed in a focal plane intersected by the viewing axis (64). A monocle assembly (40) having an axis coincident with the viewing axis (64) forms an exit pupil for the image.

2 Claims, 2 Drawing Sheets

MONOCULAR OPTICAL INSPECTION SYSTEM WITH LONG EYE RELIEF AND ENHANCED DEPTH PERCEPTION

BACKGROUND OF THE INVENTION

1. Field of the Invention

This invention relates to optical magnification systems. More specifically, this invention relates to monocular optical inspection systems.

While the present invention is described herein with reference to a particular embodiment for a particular application, it is understood that the invention is not limited thereto. Those having ordinary skill in the art and access to the teachings provided herein will recognize additional embodiments within the scope thereof.

2. Description of the Related Art

Visual inspection of manufactured products is a common practice in many fields of industry. For example, in the electronics industry inspection of components or soldering connections for defects which may render a device inoperative are routinely performed. Various means have been devised to aid the human eye in locating these and other types of defects by enlarging an image of the object under inspection through optical magnification.

One of the simpler optical magnification devices is commonly known as an eye loupe. An eye loupe may include one or more optical lens elements mounted in a housing generally cylindrical in shape. One using an eye loupe would typically hold one end of the loupe next to an eye and position an article to be examined at the opposite end of the eye loupe with a free hand. Alternatively, the object under inspection is often positioned on a planar observation surface and examined by a viewer translating the eye loupe just above the object. Both of the above modes of inspection have obvious shortcomings. In the former case both hands of the viewer are occupied, thus preventing simultaneous inspection and modification of the device under scrutiny. Viewers utilizing the latter mode of observation are subject to fatigue resulting from craning over the article under examination. Close proximity of the viewer to the examined object may result in contamination or may allow physical characteristics of the viewer such as a long nose or beard to partially obscure the object.

Microscopes provide another means of optical magnification which find application in a variety of industrial fields and overcome some of the disadvantages of eye loupes. In contrast to eye loupes microscopes are typically mechanically self supporting. This feature of self support allows simultaneous inspection and modification of an article under examination as the hands of a viewer are typically unconstrained while observing the article. Additionally, the face of a viewer is separated by a larger distance from an object under observation when a microscope rather than an eye loupe is used thereby reducing the chance of inadvertently contaminating or partially obscuring an object under view. Despite overcoming some of the disadvantages of eye loupes, microscopes often possess certain characteristics which may make them a less desirable means of optical magnification when utilized over extended periods. Specifically, commercially available microscopes typically have exit pupils on the order of 0.06 to 0.15 inch in diameter and eye relief of approximately 0.6 to 0.8 inch. An exit pupil is an area of space adjacent to the eyepiece of an optical instrument through which an observer may view an image of a magnified object. Eye relief refers to the distance from the eyepiece of an optical instrument to a point in space at which an observer is afforded a maximum field of view. Movement of a viewing pupil outside of the exit pupil or away from a plane parallel to the surface of the eyepiece at the eye relief distance may result in partial or total loss of view of the image of the object under magnification. The distance from this plane a viewer may move without experiencing significant loss of field of view generally increases with increasing eye relief. Hence, longer eye relief and enlarged exit pupils generally allow increased freedom of motion thereby reducing viewer fatigue.

The upright, linear structural configuration of many microscopes can also contribute to viewer fatigue. Specifically, this orientation often requires a craning of the neck to view an image through the microscope eyepiece. Moreover, this upright structure may prevent unaided line of sight viewing of the object under magnification unless the observer physically moves relative to the eyepiece. Convenient line of sight viewing may be important in applications involving modification of the object under magnification.

An optical magnification device better suited than many microscopes to applications requiring viewing periods of extended duration is the Metron 3-D Scanner manufactured by Metron Optics, Inc. of Solana Beach, Calif. The eye port of the device is located in a plane perpendicular to that of the object under magnification which allows a viewer to remain in an upright position. Additionally, an exit pupil of larger area than that of many microscopes enables a viewer greater freedom of motion thereby reducing fatigue. However, rather than being circular the exit pupil of the Metron is substantially trapezoidal in shape which imposes asymmetric constraints on viewer eye movement.

Included among other potentially undesirable characteristics of the Metron are its large size and substantial weight. Housing dimensions on the order of 22" limit the utility of the Metron in often cramped laboratories or in industrial applications already pressed for work station space. Further, the large optical elements within the Metron may be susceptible to extraneous light and reflections. Additionally, large optical elements are expensive to manufacture and the objective lens is not insulated from the working area containing the object under view. This lack of insulation increases the risk of contaminating optical elements of the device. Further, though larger than that of many microscopes the working distance between the objective lens of the Metron and the object being observed is less than desired for some applications.

Hence, a need in the art exists for a compact optical magnification system having substantial eye relief, a large and circular exit pupil, unaided line of sight viewing of an object under observation with minimal viewer movement, and a relatively large working distance between the object and an objective lens element of the magnification system.

SUMMARY OF THE INVENTION

The need in the art for an optical magnification system having substantial eye relief, a large exit pupil, and line of sight viewing of an object under observation is addressed by the monocular inspection system of the present invention. The inspection system of the present invention includes an objective means which forms an image of the object and which has an axis coincident with an optical path. A prism means redirects the optical path to coincide with a viewing axis such that the image is formed in a focal plane intersected by the viewing axis. A monocle means having an axis coincident with the viewing axis forms an exit pupil wherein the image is visible through the exit pupil.

DESCRIPTION OF THE INVENTION

Figure 1:
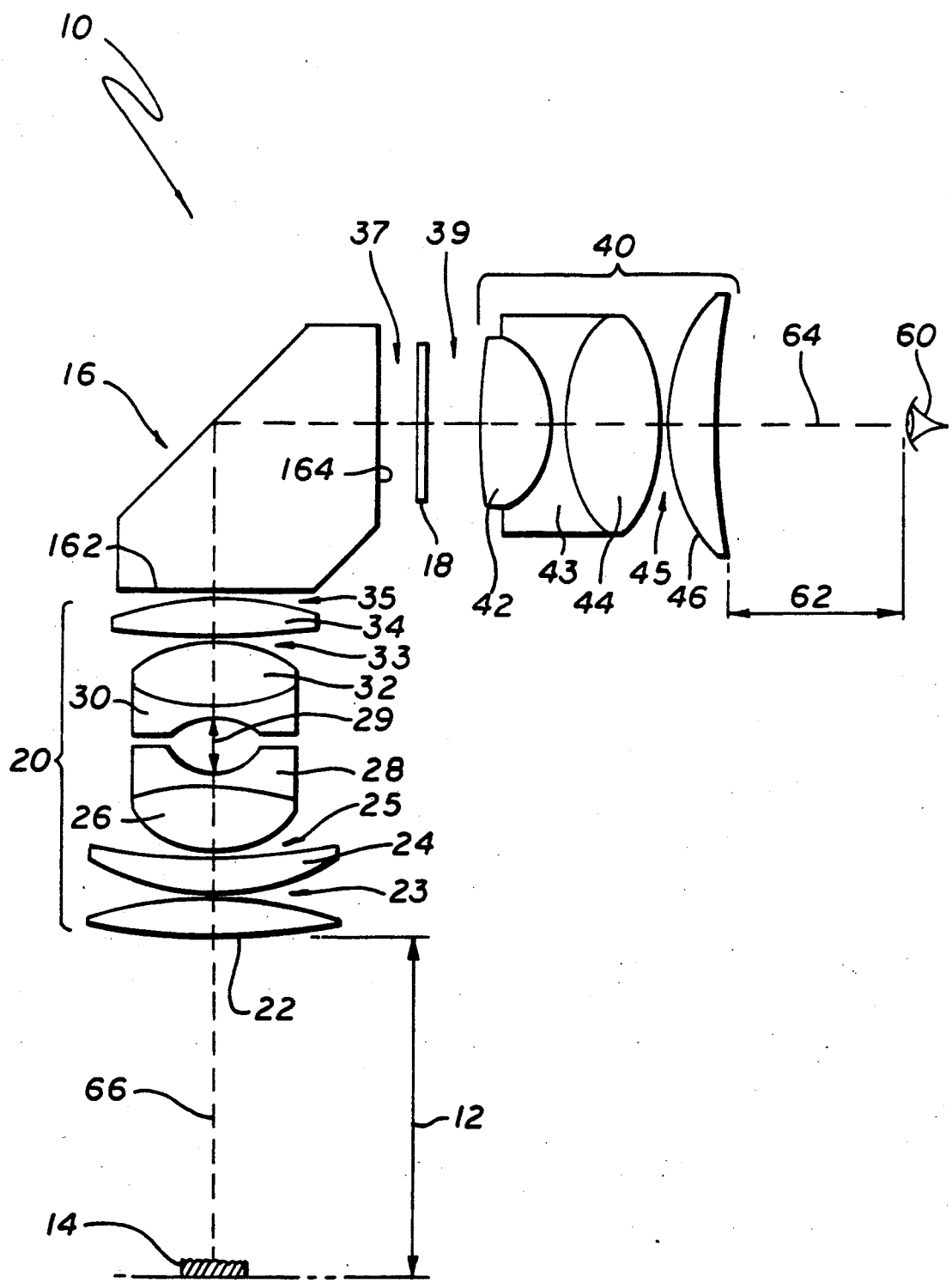
FIG. 1 is an illustrative representation of the optical elements comprising a preferred embodiment of the present invention.

As shown in FIG. 1, the monocular optical magnification system 10 of the present invention includes an objective lens assembly 20 positioned a working distance 12 above an object 14. The object 14 and objective lens assembly 20 are aligned to an optical axis 66. A prism construct 16 is positioned between a reticle 18 and the objective lens assembly 20. The reticle 18 lies in the focal plane of the objective lens assembly 20. A monocular eyepiece assembly 40 is positioned adjacent to the reticle 18.

The objective lens assembly 20 forms an image of the object 14. The prism 16 redirects the optical axis 66 to coincide with a viewing axis 64 which allows the image of the object 14 to be formed on the reticle 18. A viewer 60 positioned an eye relief distance 62 from the monocular eyepiece assembly 40 observes an image of the object 14 through the monocular eyepiece assembly 40.

The objective lens assembly 20 includes seven lens elements. The optical axis 66 passes through the vertex of a first objective lens 22. The positive biconvex first objective lens 22 has predetermined radii of curvature on both convex surfaces. Further, the first objective lens 22 has a predetermined thickness at its vertex.

A positive concave-convex second objective lens 24 is positioned a predetermined spacing distance 23 from the first objective lens 22. The optical axis 66 passes through the vertex of the second objective lens 24. The second objective lens 24 has a predetermined vertex thickness and has surfaces of predetermined radii of curvature.

A spacing distance 25 separates a third objective lens 26 from the second objective lens 24. Both convex surfaces of the positive third objective lens 26 have predetermined radii of curvature. The optical axis 66 passes through the vertex of the third objective lens 26 wherein the vertex thickness is predetermined.

A fourth objective lens 28 is coupled by conventional means known to those skilled in the art to the third objective lens 26. Both surfaces of the negative biconcave fourth objective lens 28 have predetermined radii of curvature. The optical axis 66 passes through the vertex of the fourth objective lens 28 wherein the vertex thickness is predetermined.

A spacing distance 29 separates a fifth objective lens 30 from the doublet formed by the union of the fourth objective lens 28 and the third objective lens 26. The optical axis 66 passes through the vertex of the negative biconcave fourth objective lens 30. Both surfaces of the fifth objective lens 30 have predetermined radii of curvature and the vertex thickness is predetermined.

The fifth objective lens 30 is joined by conventional means to a sixth objective lens 32 thus forming a doublet. The positive biconvex sixth objective lens 32 has surfaces of predetermined radii of curvature and a predetermined vertex thickness. The optical axis 66 passes through the vertex of the sixth objective lens.

A spacing distance 33 lies between a seventh objective lens 34 and the sixth objective lens 32. The positive biconvex seventh objective lens 34 has surfaces of predetermined radii of curvature and has a predetermined vertex thickness. The optical axis 66 passes through the vertex of the seventh objective lens.

Characteristics of the seven objective lens elements 22,24,26,28,30,32 and 34 as well as the width of the spaces 23,25,29 and 33 are adjusted to enable the objective lens assembly 20 to comply with a set of design specifications. Lens attributes including radius of curvature, glass material and lens thickness are parameters which may be manipulated to allow the objective lens assembly 20 to exhibit certain optical properties. For example, included among these properties may be focal length, magnification or aberration correction. In general, no individual lens element solely determines the magnitude of one of these properties. Rather, the design process involves balancing contributions of various lens elements to each of the properties of interest. Though subsumptions involving the specific contribution of individual lens types to optical properties of the entire objective lens assembly 20 are not typically made because of the synergistic relationship between individual lens types implied above, it is noted that negative lens elements are often employed to correct chromatic aberration and flatten the field of view while positive lens elements may play a more significant role in determining overall magnifying power or focal length.

A spacing distance 35 separates the prism construct 16 from the seventh objective lens 34. The prism construct 16 redirects the optical axis 66 to coincide with the viewing axis 64. In this manner an image of the object 14 is formed in the plane of the reticle 18 by the objective assembly 20. Also, the prism construct 16 reorients this image properly left to right and top to bottom to a predetermined position relative to the viewing axis 64. The prism construct 16 includes principal surfaces 162 and 164 of typically infinite radius of curvature. The length between the point on the principal surface 162 intersected by the optical axis 66 and the point on the principal surface 164 intersected by the viewing axis 64 is generally predetermined and affects location of the image of the object 14 in the plane of the reticle 18.

The reticle 18 is positioned a predetermined spacing distance 37 from the principal surface 164 and is intersected by the viewing axis 64. The reticle 18 may provide a visual frame of reference relative to an image of the object 14 formed by the objective lens assembly 20. For example, the reticle 18 may visually indicate with a cross hair a particular region of the object 14 to be scrutinized by the viewer 60. Usually the reticle has planar surfaces and a predetermined thickness.

The monocular eyepiece assembly 40 includes four lens elements. A first eyepiece lens 42 is separated by a spacing distance 39 from the reticle 18. The positive biconvex first eyepiece lens 42 is intersected at its vertex by the viewing axis 64. Both convex surfaces of the first eyepiece lens 42 have predetermined radii of curvature. Also, the thickness at the vertex of the first eyepiece lens 42 is predetermined.

A second eyepiece lens 43 is joined to the first eyepiece lens 42 by conventional means. The negative biconcave second eyepiece lens 43 has a vertex thickness that is predetermined. The viewing axis 64 passes through vertex of the second eyepiece lens. The concave surfaces of the second eyepiece lens 43 have predetermined radii of curvature.

Coupled by conventional means to the second eyepiece lens 43 is a third eyepiece lens 44 thus forming a triplet which includes the lenses 42,43 and 44. The positive biconvex third eyepiece lens 44 is intersected at its vertex by the viewing axis 64. Both concave surfaces of the second eyepiece lens 43 have predetermined radii of curvature and the vertex thickness is predetermined.

A spacing distance 45 separates the third eyepiece lens 44 from a fourth eyepiece lens 46. The positive converging meniscus fourth eyepiece lens 46 has surfaces of predetermined radii of curvature. The fourth eyepiece lens 46 is intersected by the viewing axis 64 at its vertex and has a predetermined vertex thickness.

The four eyepiece lens elements 42,43,44 and 46 as well as the spacing distances 39 and 45 are designed such that the eyepiece assembly 40 provides sufficient optical magnification power while still forming an exit pupil of suitable diameter at the desired eye relief distance 62. In a preferred embodiment, the objective lens assembly 20 relays with unity magnification an image of the object 14 to the reticle 18. Thus, in this instance the magnification provided by the eyepiece assembly 40 determines the optical power of the system 10. However, embodiments including permutations of the magnifying power of the objective lens assembly 20 and eyepiece assembly 40 given herein do not depart from the scope of the present invention.

This interdependence between the objective lens assembly 20 and the eyepiece assembly 40 may result in individual lens elements within the eyepiece assembly 40 being designed to compensate for optical image defects introduced by the objective lens assembly 20. These image defects may include coma, astigmatism, chromatic aberration or various types of distortion. Thus, it may be inappropriate to describe the function of individual lenses 42, 43, 44 and 46 when the eyepiece assembly 40 is divorced from the remainder of the system 10. However, it is noted the negative second eyepiece lens 43 may typically be employed to correct chromatic aberration or flatten the field of view. Additionally, the physical orientation of the eyepiece assembly 40 relative to the objective assembly 20 as shown in FIG. 1 allows the viewer 60 an unaided, unobstructed view of the object 14.

Figure 2:
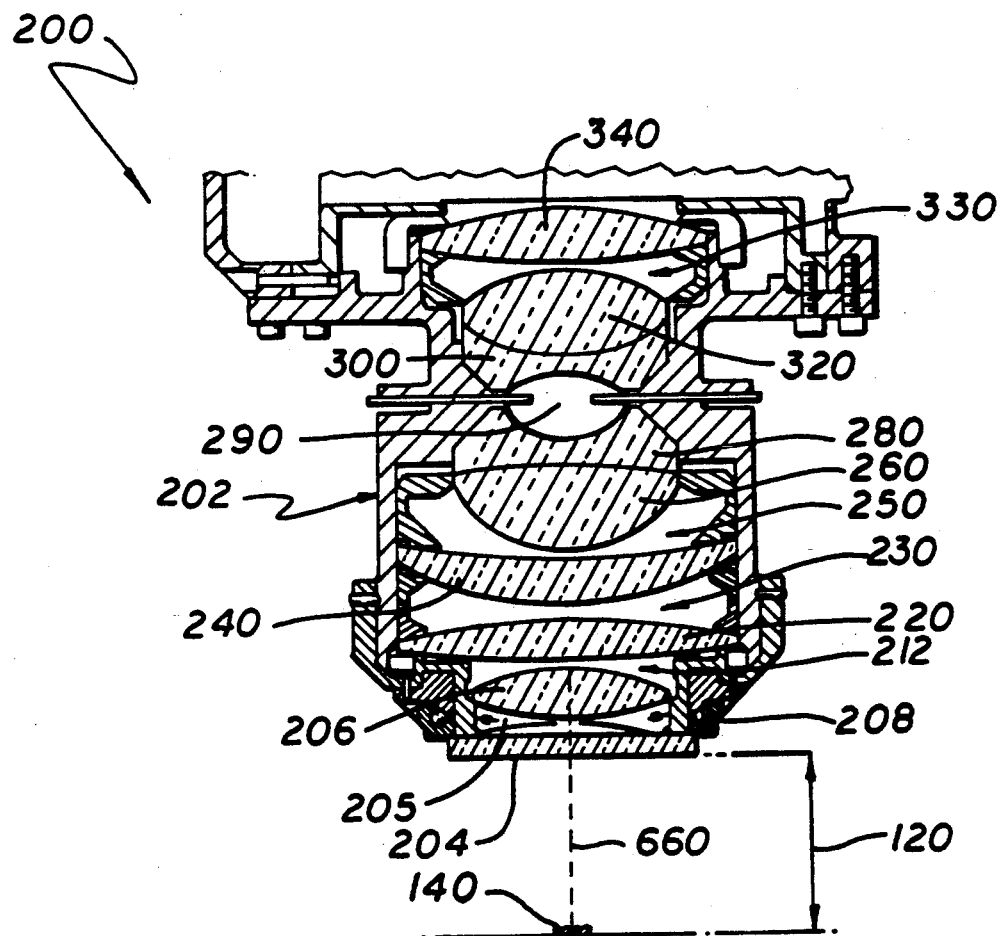
FIG. 2 is a cross sectional view of a modified objective lens assembly.

A modified objective lens assembly 200 is shown in FIG. 2. A housing 202 encloses first, second, third, fourth, fifth, sixth and seventh objective lenses 220, 240, 260, 280, 300, 320 and 340. The assembly 200 further includes a first and a second accessory lens 205 and 206, a glare reducing polarizer 204 and a fiber optic illumination ring 208. The modified objective lens assembly 200 is aligned with an optical axis 660 and positioned a working distance 120 above an object 140. A second optical magnification system may be formed by replacing the objective lens assembly 20 of the system 10 with the modified objective lens assembly 200.

The optical axis 660 coincides with the vertex of the first objective lens 220. The positive biconvex first objective lens 220 has predetermined radii of curvature on both convex surfaces. Further, the first objective lens 220 has a predetermined thickness at its vertex.

The positive concave-convex second objective lens 240 is positioned a predetermined spacing distance 230 from the first objective lens 220. The optical axis 660 passes through the vertex of the second objective lens 240. The second objective lens 240 has surfaces of predetermined radii of curvature and has a predetermined vertex thickness.

A spacing distance 250 separates the third objective lens 260 from the second objective lens 240. Both convex surfaces of the positive third objective lens 260 have predetermined radii of curvature. The optical axis 660 passes through the vertex of the third objective lens 260 wherein the vertex thickness is predetermined.

The fourth objective lens 280 is coupled by conventional means known to those skilled in the art to the third objective lens 260. Both surfaces of the negative biconcave fourth objective lens 280 have predetermined radii of curvature. The optical axis 660 passes through the vertex of the fourth objective lens 280 wherein the vertex thickness is predetermined.

A spacing distance 290 separates the fifth objective lens 300 from the doublet formed by the union of the fourth objective lens 280 and the third objective lens 260. The optical axis 660 passes through the vertex of the negative biconcave fourth objective lens 300. Both surfaces of the fifth objective lens 300 have predetermined radii of curvature and the vertex thickness is predetermined.

The fifth objective lens 300 is joined by conventional means to the sixth objective lens 320 thus forming a doublet. The positive biconvex sixth objective lens 320 has surfaces of predetermined radii of curvature and a vertex thickness which is predetermined. The optical axis 660 passes through the vertex of the sixth objective lens.

A spacing distance 330 lies between the seventh objective lens 340 and the sixth objective lens 320. The positive biconvex seventh objective lens 340 has surfaces of predetermined radii of curvature and has a predetermined vertex thickness. The optical axis 660 passes through the vertex of the seventh objective lens.

A spacing distance 212 separates the second accessory lens 206 from the first objective lens 220. The positive biconvex second accessory lens 206 is centered about the optical axis 660, has a vertex thickness which is predetermined, and has surfaces of predetermined radii of curvature. Coupled by conventional means to the second accessory lens 206 is the first accessory lens 205 thus forming a doublet easily appended to the housing 202. The vertex of the first accessory lens 205 is intersected by the optical axis 660. The negative biconcave first accessory lens 205 has surfaces of predetermined radii of curvature and has a predetermined vertex thickness. Inclusion of the accessory lenses 205 and 206 within the housing 202 is optional and generally alters the magnifying power of the modified objective lens assembly 200.

Circumscribing the accessory lenses 205 and 206 is the fiber optic illumination ring 208. The illumination ring 208 emanates radiant energy which passes through the glare reducing polarizer 204. The polarizer 204 is typically planar and is attached to the housing 202 thereby insulating optical elements within the housing 202 from external contaminants. Polarized light incident on the object 140 is reflected and polarized a second time upon propagating through the polarizer 204 toward the accessory lenses 205 and 206. In this manner specular reflections of light by the object 140 from the illumination ring 208 are reduced in intensity.

Characteristics of the nine lens elements 205, 206, 220, 240, 260, 280, 300, 320 and 340 as well as the width of the spaces 212, 230, 250, 290 and 330 are adjusted to enable the modified objective lens assembly 200 to comply with given design specifications. Lens attributes including radius of curvature, glass material and lens thickness are parameters which may be manipulated to allow the modified objective lens assembly 200 to exhibit certain optical properties. For example, included among these properties may be focal length, magnification, aberration correction, or exit pupil diameter. In general, no individual lens element solely determines the magnitude of one of these properties. It follows that generalizations involving the specific contribution of individual lens types to optical properties of the entire modified objective lens assembly 200 may be inaccurate. Nevertheless, it is noted that negative lens elements are often employed to correct chromatic aberration and flatten the field of view while positive lens elements may play a more significant role in determining overall magnifying power or focal length.

The following table gives a specific optical prescription providing the system 10 of FIG. 1 with 4× magnification. The glass types mentioned are classified on the basis of index of refraction and dispersion and are known to those skilled in the art. Those entries listed under "Front" refer to the radius of curvature of that lens surface of the specified lens element first intersected by light energy propagating in a direction toward the viewer 60.

| | Optical Prescription I - 4× Magnification | | | |
|---|---|---|---|---|
| | Glass | Radius of Curvature | | Vertex Thickness |
| Element | Type | Front | Back | (inches) |
| First Objective Lens (22) | LAK10 | 22.21920 | −6.87958 | 0.50000 |
| Space (23) | — | — | — | 0.05000 |
| Second Objective Lens (24) | LAK10 | 3.44053 | 15.12312 | 0.60000 |
| Space (25) | — | — | — | 0.05000 |
| Third Objective Lens (26) | SK16 | 1.39858 | −7.41992 | 1.00000 |
| Fourth Objective Lens (28) | SF15 | −7.41992 | 0.74145 | 0.20000 |
| Space (29) | — | — | — | 0.85000 |
| Fifth Objective Lens (30) | F2 | −1.02590 | 2.02285 | 0.20000 |
| Sixth Objective Lens (32) | LAKN12 | 2.02285 | −1.65000 | 1.00000 |
| Space (33) | — | — | — | 0.05000 |
| Seventh Objective Lens (34) | LAKN12 | 9.14835 | −4.44114 | 0.60000 |
| Space (35) | — | — | — | 0.10000 |
| Prism (16) | BAK1 | INF | INF | 5.12132 |
| Space (37) | — | — | — | 0.68815 |
| Reticle (18) | BK7 | INF | INF | 0.040 |
| Space (39) | — | — | — | 0.85642 |
| First Eyepiece Lens (42) | SF15 | 9.14835 | −1.65000 | 1.05000 |
| Second Eyepiece Lens (43) | SF57 | −1.65000 | 2.02285 | 0.20000 |
| Third Eyepiece Lens (44) | LAFN2 | 2.02285 | −3.44053 | 1.45000 |
| Space (45) | — | — | — | 0.05000 |
| Fourth Eyepiece Lens (46) | LAFN2 | 2.65377 | 15.12312 | 0.90000 |

The following prescription for the accessory lenses 205 and 206 results in the modified objective lens assembly 200 displaying 2.5× magnification. Hence, when the accessory lenses 205 and 206 are added as described previously to the optical elements in the 4× magnification system of Optical Prescription I a 10× magnification system is realized. With the exception of the accessory lenses 205 and 206 all of the elements of the 10× magnification system have substantially identical optical prescriptions to those given in Optical Prescription I.

| | Optical Prescription II - 10× Magnification | | | |
|---|---|---|---|---|
| | Glass | Radius of Curvature | | Vertex |
| Element | Type | Front | Back | Thickness |
| First Accessory Lens (205) | SF57 | −5.38144 | 4.43507 | 0.08000 |
| Second Accessory Lens (206) | LASF30 | 4.43507 | −1.94214 | 0.56000 |
| Space (212) | — | — | — | 0.05000 |

The preceding optical prescriptions produce an exit pupil having a diameter of approximately 1.0 inch at an eye relief distance of 2.7 inches from the monocular eyepiece assembly 40. These relatively large dimensions permit a greater degree of freedom of motion than allowed by conventional microscopes which may typically generate exit pupil diameters of only 0.06 to 0.15 inch at eye relief distances of 0.6 to 0.8 inch.

Figure 3:
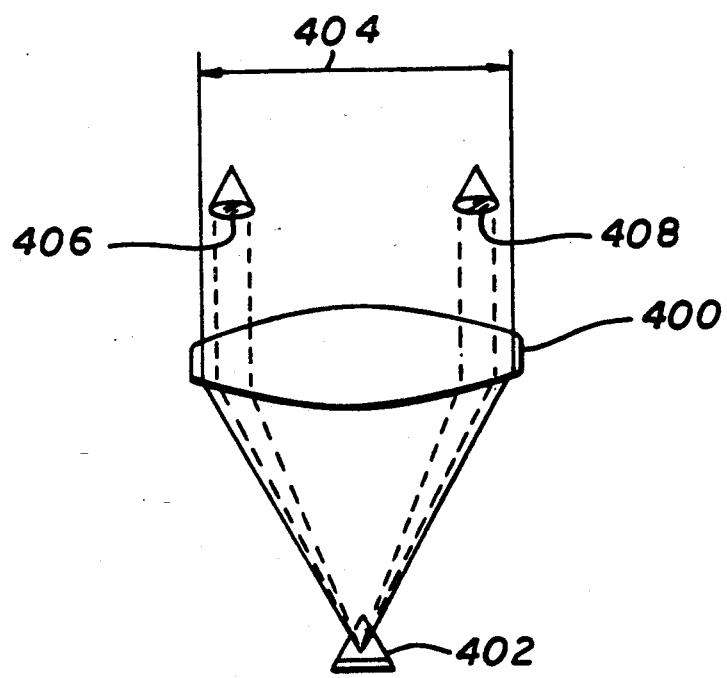
FIG. 3 illustrates a process by which translation within an exit pupil enhances depth perception.

The large exit pupil diameter provided by the present invention enables increased perception of vertical relief features of the object 14. FIG. 3 illustrates the mechanism by which the improved perception of objects in a third spatial dimension is achieved. Specifically, FIG. 3 includes an object 402, an optical device 400 for generating an exit pupil 404, a first viewing position 406 and a second viewing position 408. The device at the viewing positions may be a human eye, a camera or other instrument suitable for optical detection. In translation from the first position 406 to the second position 408 the device receives light emerging at differing angles from the object 402. This phenomenon renders the perception of seeing around the object 402 as the viewing position is changed. The changing view angle of the object 402 is perceived by the viewer as three dimensional depth perception. The present invention further enhances three dimensional viewing by increasing the perceived height of vertical features by a factor proportional to the square of the actual feature height. This feature of the present invention affords increased ease of inspection of an object. For example, a human viewer may inspect sides of a cavity on the surface of the object 402 by translating his or her viewing pupil throughout the exit pupil 404 rather than by physically moving the object 402. Moreover, in conventional optical magnification devices providing relatively smaller exit pupils such physical motion of an object under view may be required to obtain even a limited amount of depth perception.

While the present invention has been described herein with reference to a particular embodiment, it is understood that the invention is not limited thereto. The teachings of this invention may be utilized by one having ordinary skill in the art to make modifications within the scope thereof. For example, the invention is not limited to utilization of particular optical elements described herein nor is it limited to the specific optical prescriptions set forth. Other suitable lens configurations may be employed to provide alternate degrees of magnification without departing from the scope of the invention. Similarly, the invention is not limited to a specific structural relationship between an eyepiece and objective assembly. It is therefore contemplated by the appended claims to cover any and all such modifications.

Accordingly, what is claimed is:

1. A monocular optical inspection system having an optical path comprising:

objective means having an axis coincident with an optical path and positioned a working distance from an object for forming an image of said object in a focal plane wherein said objective means is disposed to secure a lens means for altering the optical power of said system;

polarizing means having an axis coincident with said optical path;

lamp means for emanating radiant energy which passes through said polarizing means for illuminating said object;

prism means for redirecting said optical path to coincide with a viewing axis;

reticle means intersected by said viewing axis and positioned in said focal plane for providing a visual frame of reference relative to said image; and monocle means for forming an exit pupil at a distance greater than one inch from said monocle means, wherein said image is visible through said exit pupil and said monocle means is positioned relative to said objective means such that a viewer observing said image through said exit pupil also has an unaided view of said object.

2. The optical inspection system of claim 1 wherein said polarizing means is substantially planar and is secured to a housing containing said objective means thereby insulating said objective means from said object.

* * * * *